A. ORTON.
FUEL TANK FOR AUTOMOBILES.
APPLICATION FILED MAR. 6, 1914.
1,139,439.
Patented May 11, 1915.
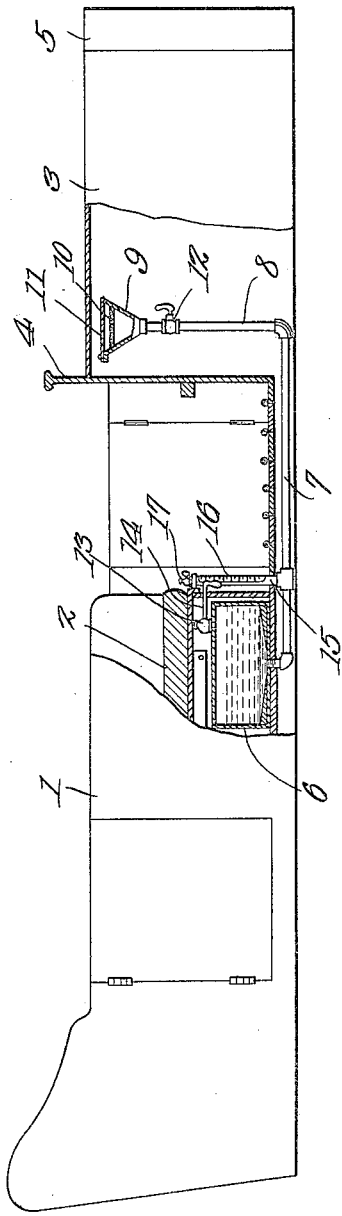
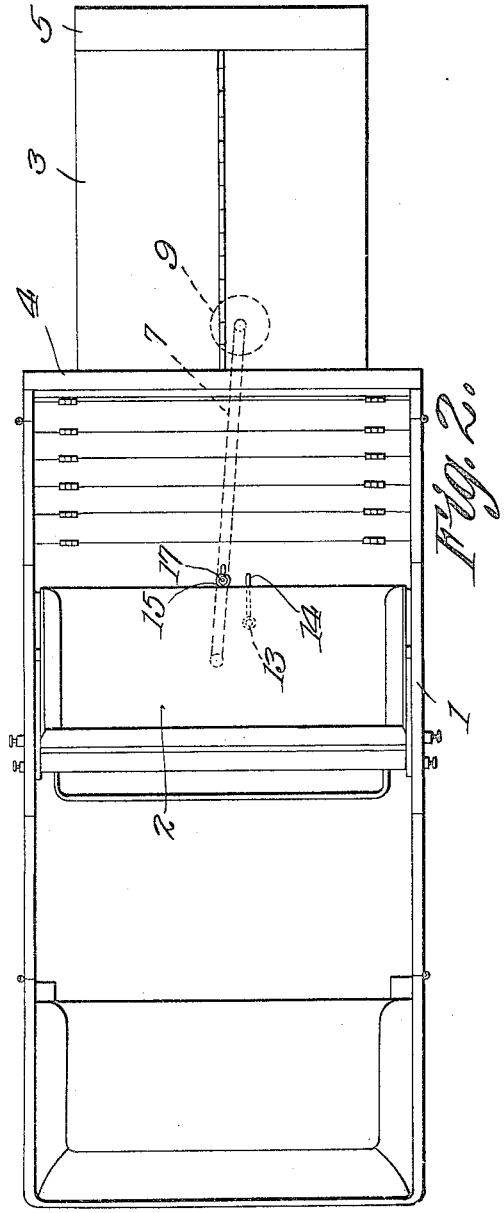
Alfred Orton
Inventor,
by C. A. Snow & Co.
Attorneys.
Witnesses

UNITED STATES PATENT OFFICE.

ALFRED ORTON, OF CHEYENNE, WYOMING.

FUEL-TANK FOR AUTOMOBILES.

1,139,439. Specification of Letters Patent. Patented May 11, 1915.

Original application filed January 23, 1913, Serial No. 743,863. Divided and this application filed March 6, 1914. Serial No. 823,013.

*To all whom it may concern:*

Be it known that I, ALFRED ORTON, a citizen of the United States, residing at Cheyenne, in the county of Laramie and State of Wyoming, have invented a new and useful Fuel-Tank for Automobiles, of which the following is a specification.

The present invention appertains to a fuel tank for automobiles, this application being a division of the application filed January 23, 1913, Serial No. 743,863.

It is the object of the present invention to provide in combination with a fuel or gasolene tank disposed underneath the front or chauffeur's seat, a novel means whereby the contents of the tank may be readily inspected, and means whereby the tank may be filled in a convenient and ready manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of an automobile body, partially broken away, illustrating the improvements embodied therewith. Fig. 2 is a plan view of the automobile body and improvements.

Referring specifically to the drawing, the numeral 1 designates the body of an automobile or motor car, embodying the front or operator's seat 2, and the hood 3 between the dash 4 and the radiator 5.

In carrying out the present invention, the gasolene or fuel tank 6 is disposed on the bottom or bed of the body, underneath the front seat 2, and a filling pipe 7 is extended forwardly from under the fuel tank 6 below the bottom or bed of the automobile body beyond the dash 4, the forward end of the filling pipe 7 being upturned or bent vertically, as at 8. The rear end of the pipe 7 is connected centrally to the bottom of the fuel tank 6, the fuel tank being preferably sloped from its sides to the central portion, to facilitate the gravitation of the fuel into the pipe 7 under the various conditions, especially when the automobile body is tilted or inclined.

The upturned forward end 8 of the filling or supply pipe 7, is housed underneath the hood 3, and carries a filling funnel 9 underneath the crest or ridge of the hood adjoining the dash 4. The funnel 9 is preferably provided with a sieve or screen 10, and with a pivoted cover or cap 11. The upturned end 8 of the pipe is also provided with a valve 12 directly below the funnel 9. It is to be noted that the funnel 9 and valve 12 are each located at a higher level than the tank 6, whereby when the tank is filled, the level of the fuel within the upturned portion 8 of the supply pipe 7 will be below the valve 12 and funnel 9.

The top of the fuel tank 6 is provided with vent valve 13 below the seat 2, the valve having its stem 14 directed forwardly from under the seat, where it will be readily accessible by the operator or chauffeur.

The filling pipe 7 is provided with an upstanding branch 15 directly in advance of the seat 2, or in front of the tank 6 and a graduated glass gage 16 is confined within the branch 15 and is exposed, so as to indicate the contents of the fuel tank in gallons or other unit of liquid measure. The branch 15 is preferably provided with a vent-valve 17 at its upper end.

The advantages incident to the positioning of the tank below the front seat are obvious, and need not be described at length. With the provision of the filling pipe 7 extending forwardly and then upwardly within the hood 3 and carrying the funnel 9, it will be noted that the fuel tank may be readily filled by opening the hood 3, the cover 11 of the funnel being opened, to permit the gasolene or other fuel to be poured into the funnel. The vent valve 13 is then opened, as well as the valve 12, which will permit the gasolene to gravitate or flow into the fuel tank, the amount of fuel within the tank being indicated on the gage 16, which gage is clearly visible from the front seat, or the sides of the automobile body. After the fuel tank has been sufficiently filled, the vent valve 13 and the valve 12 are closed, as is also the cover 11 of the funnel, after which, the hood 3 may be replaced, so as to inclose the funnel and filling pipe. The branch 15 and the gage 16 carried thereby will not encumber the front seat of the machine, and the valve 17 may be normally closed, to prevent the escape of fuel by evaporation, the valve 17 only being opened when necessary.

This branch 15 and graduated glass 16 and the necessary fittings may be attached to any gasolene storage tank, whether the tank be under front seat or at dash board, or otherwise, and the amount of gasolene can be readily seen at all times.

Having thus described the invention, what is claimed as new is:—

The combination with an automobile body including a front seat and a hood, a fuel tank disposed below the said seat, a vent valve carried by the top of the tank and having a stem projecting forwardly from under the seat, a filling pipe disposed below the body and having its respective ends attached to the bottom of the tank and upturned within the hood, a funnel carried by the upturned end of the pipe at a higher level than the tank, a valve for the upturned end of the pipe below the funnel and at a higher level than the tank, said pipe having an upstanding branch directly in front of the tank, a transparent gage carried by the said branch to indicate the contents of the tank, and a vent valve attached to the upper end of the said branch.

In testimony that I claim the foregoing as my own, I have hereto affixed my signature in the presence of two witnesses.

ALFRED ORTON.

Witnesses:
A. E. FAIR,
H. J. DUDROWE.

Copies of this patent may be obtained for five cents each, by addressing the "Commissioner of Patents, Washington, D. C."